though another ply is superimposed thereover, and the superimposed plies are passed between press rolls which squeeze the two plies together and produce a firm bond therebetween in cooperation with the adhesive.

United States Patent Office 3,163,618
Patented Dec. 29, 1964

3,163,618
ADHESIVE COMPOSITION COMPRISING POLYVINYL ACETATE AND ALUMINUM SILICATE
David S. Nicol and Francis J. Shine, Richmond, Va., assignors to Colonial Chemical Corporation, Richmond, Va., a corporation of Virginia
No Drawing. Filed Oct. 20, 1960, Ser. No. 63,727
8 Claims. (Cl. 260—29.6)

The present invention relates to a new and novel waterproof adhesive and process of manufacture thereof, and more particularly to a type of waterproof adhesive employed in laminating cellluosic structures to one another.

Liquid adhesives of the type contemplated in the present invention are generally employed with laminating machines wherein it is desired to unite cellulosic plies such as paper by applying a film of the adhesive to one of the plies, then superimposing another ply, and applying pressure with or without accompanying heat to produce a laminated structure.

For example, fiberboard or boxboard as well as corrugated board are generally manufactured in this manner.

The adhesives of the type contemplated by the present invention are employed with modern high-speed machines, and the high-speed operations involved create certain problems which demand particular characteristics of the adhesive employed with the machine.

In a typical operation, the adhesive may be applied to the cellulosic ply at a temperature of about 160° F. whereupon another ply is superimposed thereover, and the superimposed plies are passed between press rolls which squeeze the two plies together and produce a firm bond therebetween in cooperation with the adhesive.

When the laminated structure emerges from such high-speed machines, there is generally a tendency for the edges of the plies of the laminated structure to curl and pull away from one another. This, of course, results in an unsatisfactory structure at the edges thereby necessitating the trimming off of such edge portions which have not remained adhesively secured to one another. This curling and pulling away of the edge portions results in what is termed as "broke" in the art which is completely useless and must be discarded, and the broke may amount to as much as 16 percent of the total board footage produced by a particular machine. This, of course, results in a great loss in normal operation of this type of machine.

An additional problem encountered with machines of this type when employing known adhesives is the development of blisters in the central portions of the laminated structure, such blisters completely destroying the usefulness of the structure and accordingly the portions of the laminated structure having blisters in the central portions thereof must be thrown away, thereby resulting in a further costly loss.

These aforementioned problems of curling and blistering of the laminated cellulosic structure are caused primarily by the fact that the adhesive applied to the various plies of the laminated structure does not set up fast enough such that when the laminated structure emerges from the press rolls, the plies simply become unstuck from one another before the adhesive has had an opportunity to firmly bond the plies permanently together.

A further problem involved in prior art adhesives is the fact that the laminated structure is often warped, such warp often causing the laminated structure to be unsuitable for the intended use.

Laminated structures of the type employing the adhesive of the present invention are generally required to have water-resistant characteristics, and accordingly, it is a particular feature of the present invention to provide an adhesive which is substantially water-proof. In this respect, the adhesive of the present invention has proved to have greater water resistant characteristics than adhesives now employed in similar applications.

The adhesive of the present invention does set up substantially faster than known adhesives, thereby substantially reducing the amount of broke to such an extent that the loss may be cut in half as compared to operations employing the prior art adhesives. Furthermore, the aggressiveness or faster sticking characteristic of the adhesive of the present invention permits higher production speeds and thus increases the efficiency of operation of the machine with which it is employed. The adhesive of the present invention provides further economy in that a less amount of adhesive is required to obtain the same degree of adhesion as is obtained with prior art adhesives.

When employing liquid adhesives of the type according to the present invention, it is necessary to effectively control the amount of penetration of the adhesive into the cellulosic structure with which it is employed. This has been accomplished in the prior art generally by the utilization of clay. Prior art adhesives have utilized clay in such proportions and of such a nature that although effective penetration control is obtained, the clay has exhibited a pronounced tendency to stick to the adhesive applying rolls of the laminating machine. Accordingly, these rolls must be cleaned periodically thereby resulting in down-time of the machine which, of course, results in a less economical operation.

The present invention obtains good control of the penetration of the adhesive into the cellulosic structure and at the same time the adhesive does not stick to the adhesive applying rolls to any appreciable degree thereby eliminating the necessity of cleaning the rolls for great lengths of time such that the down-time of the associated machine for the purpose of cleaning the adhesive applying rolls is reduced to a minimum.

The present invention also employs a novel method of manufacturing the adhesive which can be carried out in a very simple and effective manner by dispersing a mixture of predetermined proportions in a relatively cold body of water, whereupon the aqueous dispersion is elevated to a predetermined temperature and held at such temperature at a predetermined length of time. The adhesive substance may then be employed with a laminating machine in the conventional manner.

An object of the present invention is to provide a new and novel waterproof adhesive which sets up faster than prior art adhesives and provides less warp and less loss of the finished product thereby permitting higher production speeds of the associated laminating machine.

Another object of the invention is the provision of an adhesive which has better water resistant characteristics than known adhesives.

A further object of the invention is to provide a waterproof adhesive which requires a less amount of adhesive while obtaining the same amount of adhesion as is obtained with prior art adhesives.

Still another object of the invention is the provision of a waterproof adhesive which provides good control of the penetration of adhesive into a cellulosic structure and which at the same time minimizes the tendency of the adhesives to stick to the adhesive applying rolls of an associated laminating machine.

A still further object of the invention is to provide a new and novel method of manufacturing a liquid adhesive.

Other objects and many attendant advantages of the present invention will become more apparent when considered in connection with the specification.

The waterproof adhesive according to the present invention comprises three ingredients, namely, polyvinyl alcohol, aluminum silicate and powdered polyvinyl acetate. These three ingredients are preferably provided in a dry form and mixed in certain percentages as will hereinafter appear.

In ordinary circumstances, the dry mixture will be sold as a commercial product and the final liquid adhesive will be produced at the plant where the adhesive is to be employed. This, of course, substantially reduces the costs of transportation since it would cost considerably more to produce the liquid adhesive and ship it in its liquid form. As will appear hereinafter, the final liquid product can be produced in a simple and expeditious manner once the dry mixture is available.

Each of the three ingredients of the present invention must be employed within certain critical limits in order to obtain the aforementioned desired advantages and end results. These critical limitations are set forth in the following paragraphs. It should be understood that in discussions of the parts of each ingredient which is employed, the final mixture will in all circumstances include 100 total parts, and that the parts refer to parts by dry weight of the various ingredients.

Firstly referring to the polyvinyl alcohol employed in the present invention, this substance must be employed within the range of 40 to 92 parts. The lower limit of 40 parts is a minimum which is required to provide the necessary amount of water resistance. On the other hand, 92 parts of polyvinyl alcohol is the maximum amount which can be employed in a mixture since greater amounts of the polyvinyl alcohol result in a setting-up or drying of the adhesive which is too slow for the intended purpose. The polyvinyl alcohol employed in the present invention should be 98 percent to 100 percent hydrolyzed, and should have a viscosity range of between 2900 to 3500 centipoises measured at a 10 percent aqueous solution, by weight, at 25° C., this measurement being made with a Brookfield viscometer using a #3 spindle at 10 r.p.m.

Referring secondly to the aluminum silicate, this substance must be employed within the limits of 4 to 20 parts. The employment of less than 4 parts in 100 of the aluminum silicate causes adhesive penetration of the final liquid adhesive into the associated cellulosic structure. On the other hand, if the aluminum silicate is employed in proportions greater than 20 parts to 100 of the mixture, the final adhesive liquid will produce excessive dirtying of the adhesive applying rollers of the laminating machine thereby resulting in excessive down-time of the machine for the purpose of cleaning the adhesive applying rollers.

Referring now to the powdered polyvinyl acetate employed in the invention, this substance must be employed within the range of 4 to 40 parts per 100 of the mixture. If less than 4 parts to 100 of the polyvinyl acetate is employed, the drying or setting up of the adhesive occurs at too slow a rate or in fact may result in no drying effect at all. If an amount of polyvinyl acetate greater than 40 parts in 100 of the mixture is employed, the wet cost of the liquid adhesive becomes excessive and furthermore, the water resistance of the adhesive is excessively reduced.

The present invention will be better understood by reference to the following examples.

*Example I*

In the first example, a liquid adhesive having an optimum efficiency for many different applications is illustrated, and may, for example, be employed with conventional kraft paper.

A dry composition was prepared by mixing the following ingredients by weight: 80 parts of polyvinyl alcohol; 10 parts of aluminum silicate; and 10 parts of powdered polyvinyl acetate.

A liquid adhesive was prepared from the dry mixture by dispersing the dry mixture in water at room temperature in such proportions that the total solids content due to the polyvinyl alcohol, the aluminum silicate and the powdered polyvinyl acetate was 11 percent.

The aqueous dispersion was then raised to a temperature of 200° F. and held at this temperature for 15 minutes. The liquid adhesive was then cooled, and employed in a conventional manner in a laminating machine.

*Example II*

In the second example, a liquid adhesive was prepared for use with a cellulosic product which is less porous than the kraft paper with which the adhesive of Example I is to be used. For example, the liquid adhesive according to Example II may be employed with glazed kraft paper or the like.

A dry composition was prepared by mixing the following ingredients by weight: 92 parts of polyvinyl alcohol; 4 parts of aluminum silicate; and 4 parts of powdered polyvinyl acetate.

A liquid adhesive was prepared from the dry mixture by dispersing the dry mixture in water at room temperature in such proportions that the total solids content due to the polyvinyl alcohol, the aluminum silicate and the powdered polyvinyl acetate was 10 percent.

The aqueous dispersion was then raised to a temperature of 200° F. and held at this temperature for 15 minutes. The liquid adhesive was then cooled, and employed in a conventional manner in a laminating machine.

*Example III*

In the third example, a liquid adhesive was prepared for use with a relatively porous cellulosic product such as shipboard and the like.

A dry composition was prepared by mixing the following ingredients by weight: 40 parts of polyvinyl alcohol; 20 parts of aluminum silicate; and 40 parts of powdered polyvinyl acetate.

A liquid adhesive was prepared from the dry mixture by dispersing the dry mixture in water at room temperature in such proportions that the total solids content due to the polyvinyl alcohol, the aluminum silicate and the powdered polyvinyl acetate was 17 percent.

The aqueous dispersion was then raised to a temperature of 200° F. and held at this temperature for 15 minutes. The liquid adhesive was then cooled, and employed in a conventional manner in a laminating machine.

The adhesive solution obtained in each of the three above examples when utilized with a conventional laminating machine resulted in approximately 10 percent broke which, of course, is a great improvement over operations employing prior art adhesives. In addition, each of the adhesives produced in the three above examples proved to set up quickly, to effectively control the penetration of the adhesive, provided a good waterproof characteristic and furthermore exhibited a pronounced tendency to adhere to the adhesive applying rolls of the laminating machine, and accordingly use of adhesives prepared according to the present invention would result in considerably less down-time of the laminating machine.

In each of the aforementioned examples, the proportions of the dry mixture dispersed in water were such that the total solids content due to the polyvinyl alcohol, the aluminum silicate, and the powdered polyvinyl acetate was 11 percent. In actual practice, this percentage may vary within certain predetermined limits and it has been found that in order to obtain the desired results, the total solids content of water must be between about 9 percent and 20 percent.

While three specific examples have been given herein, it will be understood that variations in the proportions may be made as long as the proportions of the various ingredients remain within the critical ranges set forth previously. In addition, the percentage of total solids content to water may also be varied within the above-mentioned range. As long as these critical ranges are adhered to, the resulting product will provide the desired characteristics.

It is apparent from the foregoing that there is provided a new and novel waterproof adhesive which sets up faster than prior art adhesives, resulting in less warp and less broke and permitting higher production speeds in an associated laminating machine. The adhesive of the present invention provides better waterproof characteristics and furthermore requires less adhesive as compared to prior art adhesives for obtaining the same degree of adhesion. The adhesive according to the present invention provides very good control of the penetration into cellulosic structures and further substantially reduces the tendency of the adhesive to adhere to and dirty the adhesive applying rolls of a laminating machine. A novel method is provided for manufacturing the adhesive which can be carried out in a very simple and expeditious manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. A dry composition adapted to be dispersed in water to form a liquid adhesive comprising a mixture containing, by weight, from 40 to 92 parts of polyvinyl alcohol, from 4 to 20 parts of aluminum silicate, and from 4 to 40 parts of powdered polyvinyl acetate, the total parts of the named ingredients being 100.

2. A dry composition adapted to be dispersed in water to form a liquid adhesive comprising a mixture containing, by weight, 80 parts of polyvinyl alcohol, 10 parts of aluminum silicate, and 10 parts of powdered polyvinyl acetate.

3. A dry composition adapted to be dispersed in water to form a liquid adhesive comprising a mixture containing, by weight, 92 parts of polyvinyl alcohol, 4 parts of aluminum silicate, and 4 parts of powdered polyvinyl acetate.

4. A dry composition adapted to be dispersed in water to form a liquid adhesive comprising a mixture containing, by weight, 40 parts of polyvinyl alcohol, 20 parts of aluminum silicate, and 40 parts of powdered polyvinyl acetate.

5. A liquid adhesive comprising an aqueous dispersion of polyvinyl alcohol, aluminum silicate and powdered polyvinyl acetate, the proportions of polyvinyl alcohol, aluminum silicate and polyvinyl acetate, on a dry weight basis, being from 40 to 92 parts of polyvinyl alcohol, from 4 to 20 parts of aluminum silicate, and from 4 to 40 parts of polyvinyl acetate, the total parts of the named ingredients being 100 and the total solids content due to polyvinyl alcohol, aluminum silicate and polyvinyl acetate being about from 9 percent to 20 percent.

6. In a process for producing a liquid adhesive, the steps comprising dispersing and heating in water a mixture comprising, by weight, from 40 to 92 parts of polyvinyl alcohol, from 4 to 20 parts aluminum silicate, and from 4 to 40 parts powdered polyvinyl acetate, the total parts of the named ingredients being 100.

7. In a process for producing a liquid adhesive, the steps comprising dispersing and heating in water a mixture comprising, by weight, from 40 to 92 parts of polyvinyl alcohol, from 4 to 20 parts aluminum silicate, and from 4 to 40 parts powdered polyvinyl acetate, the total parts of the named ingredients being 100, the total solids content due to polyvinyl alcohol, aluminum silicate and polyvinyl acetate being about from 9 percent to 20 percent.

8. In a process for producing a liquid adhesive, the steps comprising dispersing in water a mixture comprising, by weight, from 40 to 92 parts of polyvinyl alcohol, from 4 to 20 parts aluminum silicate, and from 4 to 40 parts powdered polyvinyl acetate, the total parts of the named ingredients being 100, the total solids content due to polyvinyl alcohol, aluminum silicate and polyvinyl acetate being about from 9 percent to 20 percent, and then heating the aqueous dispersion to a temperature of approximately 200° F., and maintaining this temperature for about 15 minutes.

References Cited by the Examiner
UNITED STATES PATENTS

| | | | |
|---|---|---|---|
| 2,580,230 | 12/51 | Kunze et al. | 260—29.6 |
| 2,892,731 | 6/59 | Claxton | 260—29.6 |
| 3,003,979 | 10/61 | Ptasienski et al. | 260—29.6 |

OTHER REFERENCES

Landoo et al.: "Non-Metallic Minerals" (2nd edition, 1951), McGraw-Hill Book Company Inc., New York, pages 25–32.

MURRAY TILLMAN, *Primary Examiner.*
LEON J. BERCOVITZ, *Examiner.*